UNITED STATES PATENT OFFICE 2,645,666

HALOETHYLHYDROCARBONOXYCYCLO-HEXENES

John A. Hogg, Kalamazoo, Mich., assignor to The Upjohn Company, Kalamazoo, Mich., a corporation of Michigan No Drawing. Application February 24, 1951, Serial No. 212,675

9 Claims. (Cl. 260—611)

This invention relates to 1-methyl-2-(β-haloethyl)-4-hydrocarbonoxycyclohexenes and to a method for the production thereof.

The compounds of the present invention have the general structural formula:

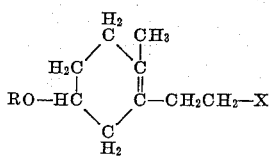

wherein X is a halogen and R is a hydrocarbon radical containing one to seven carbon atoms, inclusive, such as the methyl, ethyl, propyl, isopropyl, butyl, isobutyl, pentyl, hexyl, heptyl, cyclopropyl, cyclobutyl, cyclopentyl, cyclohexyl, phenyl and benzyl radicals and the like; of these radicals, the preferred embodiment is methyl. The group RO—, wherein R has the significance designated hereinabove, is termed a hydrocarbonoxy group.

The compounds of the present invention are useful in the preparation of steroid compounds having an oxygen atom attached to the carbon atom at the eleven position of the steroid nucleus. Such compounds are of particular value in the field of steroid research. The cortical hormones and certain derivatives thereof, which are oxygenated steroids, are known to have biological effects differing markedly from the unoxygenated steroids. It is therefore desirable to have available intermediates that can be used in the preparation of such 11-oxygenated steroids.

Compounds of the present invention can be prepared by the following procedure, starting with a para-hydrocarbonoxyphenol (such as a monoalkyl ether of hydroquinone) having the formula:

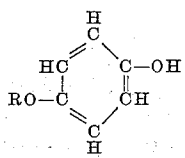

wherein R is a hydrocarbon radical as hereinbefore defined. Such compounds readily react with three molecules of hydrogen in the presence of a nickel catalyst at temperatures between approximately 130 and approximately 300 degrees centigrade to yield the corresponding saturated compound, a para-hydrocarbonoxycyclohexanol having the formula:

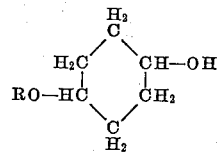

which can be oxidized to a para-hydrocarbonoxycyclohexanone having the formula:

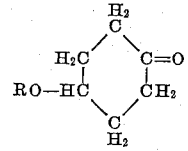

wherein R has the significance hereinbefore assigned, by the use of potassium dichromate and sulfuric acid [Helfer, Helv. Chim. Acta, 7, 953 (1924)].

The para-hydrocarbonoxycyclohexanone is converted, via a Claisen reaction using diethyl oxalate and sodium ethoxide, into a 2-ethoxalyl-4-hydrocarbonoxycyclohexanone having the formula:

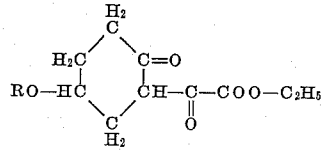

which is readily converted by means of heat and powdered soft glass into a 2-carbethoxy-4-hydrocarbonoxycyclohexanone having the formula:

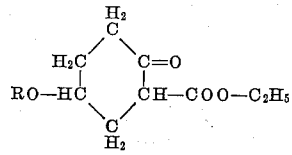

wherein R has the significance hereinbefore assigned.

The 2-carbethoxy-4-hydrocarbonoxycyclohexonone is condensed, in the presence of sodium or potassium, with a halogen-substituted tertiary amine, such as β-diethylaminoethyl chloride, having the general formula:

wherein X is a halogen, preferably chlorine or bromine, and R is a hydrocarbon radical having the significance hereinbefore assigned. The R's may be the same or different from that of the hydrocarbonoxy group. The reaction is conducted in an inert organic solvent, such as benzene, toluene or xylene, at a temperature between approximately 80 and approximately 140 degrees centigrade, preferably at about the reflux temperature of the solvent employed. The reaction is complete in from 10 to 20 hours, at the end of which time the product, a 2-carbethoxy-2-(β-disubstituted aminoethyl)-4-hydrocarbonoxycyclohexanone having the formula:

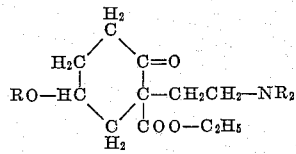

wherein the R's have the significance hereinbefore assigned, may be isolated in conventional manner, such as by extraction from the organic layer with dilute acid, e. g., hydrochloric or sulfuric, and subsequent neutralization with alkali, e. g., potassium carbonate or sodium hydroxide. The crude product is then extracted with a solvent such as ether or benzene and isolated by distillation of solvent.

The 2-carbethoxy-2-(β-disubstituted aminoethyl)-4-hydrocarbonoxycyclohexanone is then decarbalkoxylated, as with hydrochloric or sulfuric acid having a concentration between approximately 10 and approximately 20 percent, by heating at a temperature between approximately 80 and approximately 110 degrees centigrade, preferably at about reflux temperature, over a preiod of from approximately 10 to approximately 20 hours, or, alternatively, with barium hydroxide in alcohol, to produce a 2-(β-disubstituted aminoethyl) - 4 - hydrocarbonoxycyclohexanone having the formula:

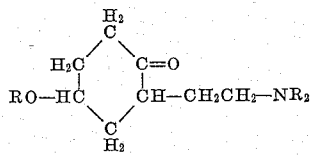

wherein the R's have the significance assigned hereinbefore. After decarbalkoxylation, the product is isolated in conventional manner, as by treatment with alkali, extraction with ether, and distillation.

The 2-(β-disubstituted aminoethyl)-4-hydrocarbonoxycyclohexanone is treated with methyl lithium in an organic solvent such as diethyl ether, tetrahydrofuran or N-methylmorpholine to produce, after hydrolysis of the intermediate addition product, a 1-methyl-2-(β-disubstituted aminoethyl) - 4 - hydrocarbonoxycyclohexanol having the formula:

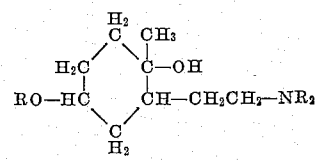

wherein the R's have the significance assigned hereinbefore. The reaction is preferably conducted at the reflux temperature of the solvent employed, and is ordinarily complete in a period of from 2 to 4 hours.

The 1-methyl-2-(β-disubstituted aminoethyl)-4-hydrocarbonoxycyclohexanol is dehydrated by means of a suitable dehydrating agent, such as potassium hydrogen sulfate, thionyl chloride in pyridine, phosphorus tribromide in pyridine, aluminum hydroxide with the cyclohexanol in the vapor phase, and the like, with phosphorus tribromide in pyridine being preferred. Such general procedures are known in the art and are conducted in conventional manner for such dehydrations. The product of the reaction is a 1-methyl-2-(β-disubstituted aminoethyl)-4-hydrocarbonoxycyclohexene-1 having the formula:

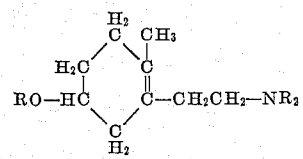

wherein the R's have the hereinbefore assigned significance. The reaction product is isolated by conventional procedure, as by dissolving in water, neutralizing with alkali, extracting with ether and subsequently distilling.

The 1-methyl-2-(β-disubstituted aminoethyl)-4-hydrocarbonoxycyclohexene-1 thus produced, on contacting in benzene solution with a cyanogen halide, yields a quaternary salt which, when heated at the boiling point of benzene, decomposes to produce a 1-methyl-2-(β-haloethyl)-4-hydrocarbonoxycyclohexene-1 having the formula:

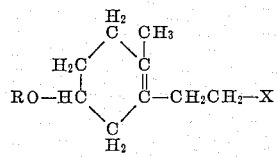

wherein R and X have the hereinbefore assigned significance. The reaction is complete in about six hours, and the product is isolated by washing the reaction mixture with dilute acid, water, drying and fractionally distilling under reduced pressure.

As stated hereinbefore, the compounds of the present invention are useful in the preparation of steroid compounds having an oxygen atom attached to carbon atom eleven of the steroid nucleus. Thus, when the compounds of the present invention are reacted with magnesium in anhydrous ether, they form a Grignard reagent having the formula:

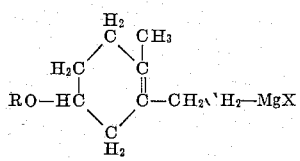

and when this is treated with a ketone having the formula:

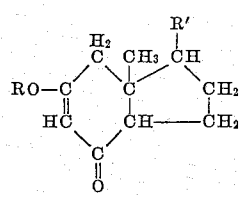

I. R'=—CH₂—CH=CH₂ wherein R has the significance hereinbefore assigned and R' is an allyl radical, a tertiary carbinol is formed having the formula:

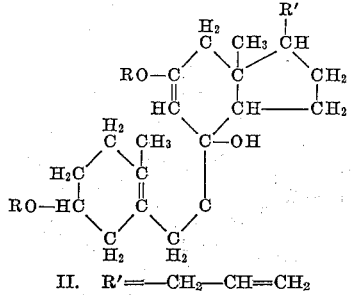

II. R'=—CH₂—CH=CH₂

Treatment of the carbinol II, which need not be isolated in pure form, with dilute acid at above room temperature results in the formation of an unsaturated ketone having the formula:

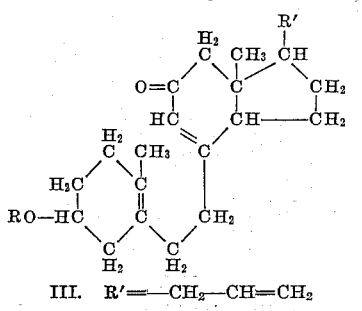

III. R'=—CH₂—CH=CH₂ wherein R has the significance hereinbefore specified and R' is an allyl radical.

Treatment of the ketone III for between approximately 2 and approximately 10 hours at between 35 and 100 degrees centigrade with about 5 volumes of 100-percent phosphoric acid or with 98–100-percent formic acid containing a few drops of concentrated sulfuric acid results in the formation of a new ring, the B ring of the steroid nucleus, and a compound having the formula:

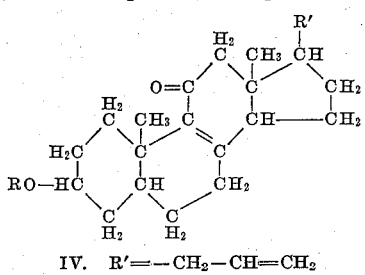

IV. R'=—CH₂—CH=CH₂ wherein R and R' have the hereinbefore assigned significance. The latter product is obtained by pouring the reaction mixture into water and collecting the precipitate, which can be purified by recrystallization from an appropriate solvent, by high vacuum distillation, by chromatography or by a suitable combination of these methods of purification.

The requisite ketones of Formula I are prepared by a series of reactions which employs acetoacetic ester and ethylene dibromide as the starting materials. The first step in the series is the reaction between the sodio derivative of acetoacetic ester and ethylene dibromide to yield a cyclic keto ester having the formula:

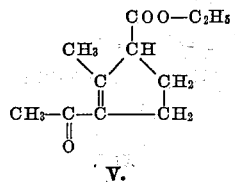

V.

Preferably an excess of the sodio derivative of acetoacetic ester is employed in order to minimize the formation of a cyclopropane derivative. The reaction is carried out by adding the ethylene dibromide dropwise to a stirred solution of the sodio derivative of acetoacetic ester in ethanol or a mixture of ethanol and ethyl acetate and heating the mixture under reflux to complete the reaction. The cyclic keto ester V is isolated by removal of the solvents, addition of water and dilute acid to the residue, extraction with an inert solvent such as ether, washing the extracts with sodium bicarbonate solution and with salt solution, drying the extract, removal of the ether and distillation of the residue.

The cyclic keto ester V is alkylated with allyl bromide to yield a compound having the formula:

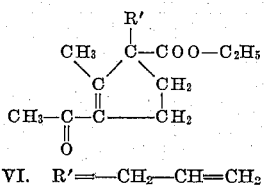

VI. R'=—CH₂—CH=CH₂

The alkylation is conducted in ethanol or tertiary butanol by converting the cyclic keto ester V to the potassium or sodium salt with one equivalent of potassium or sodium metal and treating the resulting salt with one equivalent of allyl bromide. After heating the reaction mixture under reflux for about 2 to 4 hours, the product is isolated in essentially the manner described above for the cyclic keto ester V.

The alkylated keto ester VI is hydrolyzed and decarboxylated to give a compound having the formula:

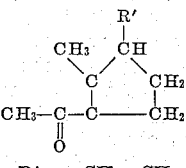

VII. R'=—CH₂—CH=CH₂

The hydrolysis is carried out in alcohol solution at the reflux temperature for about 3 hours using 2 to 3 equivalents of potassium hydroxide. The acid formed by hydrolysis of the ester is obtained by removing the solvent, adding water to the residue, extracting the aqueous solution with ether to remove some decarboxylated material, acidifying the aqueous solution to precipitate the acid, and filtering and drying the precipitated acid. Decarboxylation of the acid is effected by heating it to approximately 140 to 170 degrees centigrade. The decarboxylated product is combined with that obtained by evaporation of the ether extraction described above and purified by distillation.

Addition of malonic ester to the compound VII results in the formation of a cyclic diketone VIII having the formula:

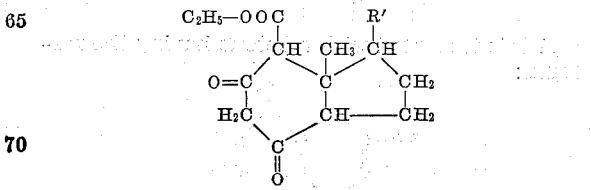

VIII. R'=—CH₂—CH=CH₂

The reaction is carried out by heating under reflux compound VII with a slight excess of malonic ester in absolute ethanol in the presence of sodium ethoxide for approximately 4 to 6 hours. The product is obtained by removing the solvent, dissolving the residue in water, extracting with ether, and acidifying the aqueous solution to precipitate the crude product, which is then purified by appropriate means.

By decarbalkoxylation of the cyclic diketone VIII, a product is obtained having the formula:

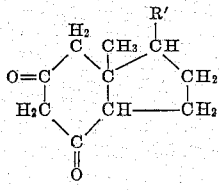

IX. R′=—CH₂—CH=CH₂

The decarboxylation is effected by heating under reflux for about 8 hours a solution of the cyclic diketone VIII in alcoholic potassium hydroxide. The product IX is obtained by removal of the alcohol, solution of the residue in water, and acidification of the aqueous solution with dilute acid to precipitate the crude product, which is purified by appropriate means.

The cyclic diketone IX is then converted to the enol ether derivative I having the formula:

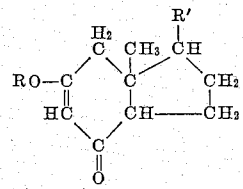

I. R′=—CH₂—CH=CH₂ by treatment with a diazoalkane at room temperature for approximately 12 to 24 hours, or by treatment with an alcohol and an acid catalyst in a water-immiscible solvent at reflux temperature for approximately 4 to 8 hours in an apparatus designed for the continuous removal of water. The enol ether I is isolated by removal of the solvent and distillation of the residue. As hereinbefore described, this product is then suitable for reaction with a Grignard reagent prepared from a 1-methyl-2-(β-haloethyl)-4-methoxycyclohexene-1.

The compounds of the present invention are also useful in the preparation of steroid compounds having an oxygen atom attached to carbon atom eleven of the steroid nucleus but lacking the angular methyl group at carbon atom thirteen. Thus, when the compounds of the present invention are reacted with magnesium in anhydrous ether to form a Grignard reagent having the formula:

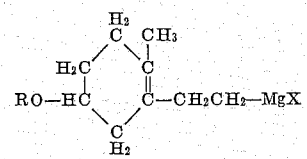

and this is treated with a ketone having the formula:

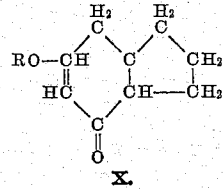

X.

wherein R has the significance hereinbefore assigned, a tertiary carbinol is formed having the formula:

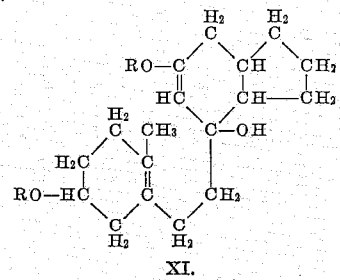

XI.

Treatment of the tertiary carbinol XI, which need not be isolated in pure form, with dilute acid at above room temperature, results in the formation of an unsaturated ketone having the formula:

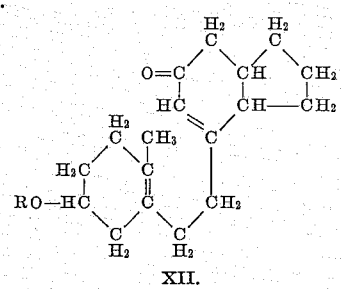

XII.

wherein R has the significance hereinbefore assigned.

Treatment of the ketone XII for approximately 2 to 10 hours at approximately 35 to 100 degrees centigrade with about 5 volumes of 100-percent phosphoric acid or with 98–100-percent formic acid containing a few drops of concentrated sulfuric acid results in the formation of a new ring, the B ring of the steroid nucleus, and a compound having the formula:

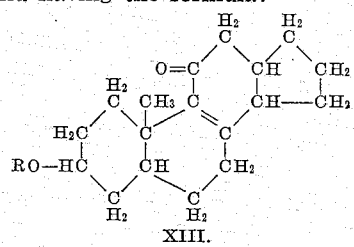

XIII.

wherein R has the significance hereinbefore assigned. The latter product is isolated by pouring the reaction mixture into water and collecting the precipitate, which can then be purified by recrystallization from an appropriate solvent, by high vacuum distillation, by chromatography or by a suitable combination of these methods of purification.

The requisite ketone of Formula X is prepared by a sequence of reactions which employs acetylcyclopentene and malonic ester as the starting materials. The addition of malonic ester to acetylcyclopentene according to the procedure previously described results in the formation of a cyclic diketone ester having the formula:

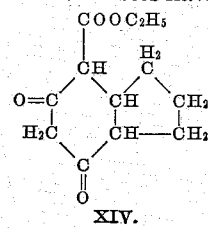

XIV.

which, after hydrolysis and decarboxylation according to the procedure hereinbefore described, yields a product having the formula:

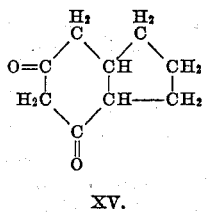

XV.

The diketone XV is converted according to the procedure hereinbefore described to the enol ether derivative X having the formula:

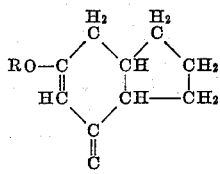

X.

which is then combined with a Grignard reagent prepared from the compounds of the present invention.

The compounds of the present invention are also useful in the preparation of steroid compounds having a six-membered D ring and an oxygen atom at carbon atom eleven in the C ring but lacking the angular methyl group at carbon atom thirteen. Thus, when the compounds of the present invention are reacted with magnesium in anhydrous ether to form a Grignard reagent having the formula:

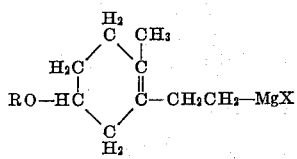

and this is treated with a ketone having the formula:

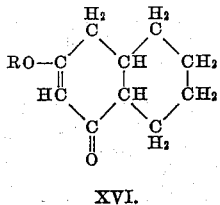

XVI.

wherein R has the significance hereinbefore specified, a tertiary carbinol is formed having the formula:

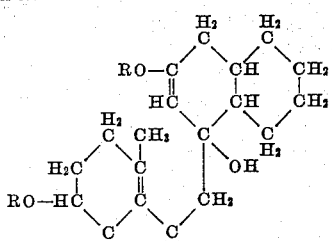

XVII.

Treatment of the carbinol XVII, which need not be isolated in pure form, with dilute acid at above room temperature results in the formation of an unsaturated ketone having the formula:

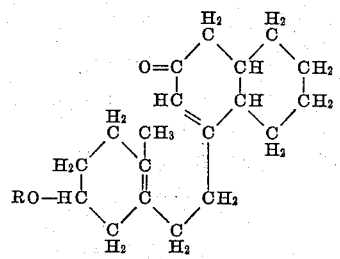

XVIII.

wherein R has the significance hereinbefore assigned.

Treatment of the ketone XVIII for approximately 2 to 10 hours at approximately 35 to 100 degrees centigrade with about 5 volumes of 100-percent phosphoric acid or with 98 to 100-percent formic acid containing a few drops of concentrated sulfuric acid results in the formation of a new ring, the B ring of the steroid nucleus, and a compound having the formula:

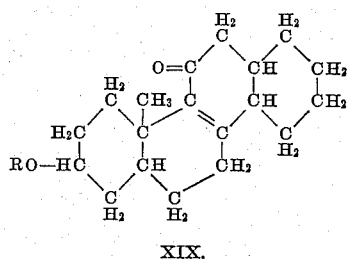

XIX.

wherein R has the significance hereinbefore specified. The latter product is isolated by pouring the reaction mixture into water and collecting the precipitate, which is purified by recrystallization from an appropriate solvent, by high vacuum distillation, by chromatography or by a suitable combination of these methods of purification.

The requisite ketone of Formula XVI is prepared by a series of reactions, the first of which is the addition of malonic ester to acetylcyclohexene to produce a cyclic diketone having the formula:

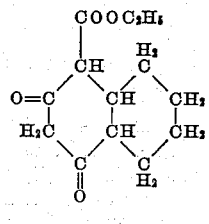

XX.

which, after hydrolysis and decarboxylation, yields a diketone having the formula:

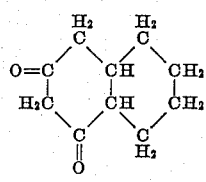

XXI.

The diketone XXI is converted according to the procedure hereinbefore described to the enol ether derivative XVI having the formula:

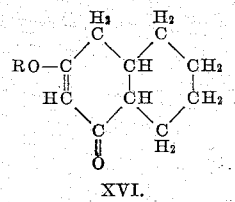

XVI.

which is then combined with a Grignard reagent prepared from the compounds of the present invention.

The following examples illustrate typical compounds of the invention and the processes by which they may be prepared. It will be understood that changes and modifications may be adopted, as is obvious to those skilled in the art, without departing from the spirit or scope of the invention.

PREPARATION 1.—4-METHOXYCYCLOHEXANOL AND OTHER 4-ALKOXYCYCLOHEXANOLS

A solution of 500 grams of 4-methoxyphenol (monomethyl ether of hydroquinone) in 800 milliliters of ethanol was subjected to hydrogenation in the presence of 165 grams (wet weight) of a Raney nickel catalyst prepared by the method of Adkins and Pavlic [J. Am. Chem. Soc., 68, 147 (1946)]. The initial pressure of the hydrogenation at room temperature was between approximately 1000 and approximately 1800 pounds per square inch and the final temperature was about 140 degrees centigrade. The total time required for the hydrogenation was approximately 2 to 3 hours. After removal of the catalyst and solvent, distillation of the residue gave 445 grams (85 percent) of 4-methoxycyclohexanol as a colorless liquid boiling at 104–105 degrees centigrade at a pressure of 13 millimeters of mercury.

In a like manner, 4-ethoxycyclohexanol can be obtained by the hydrogenation of 4-ethoxyphenol (ethyl ether of hydroquinone); 4-propoxycyclohexanol can be obtained from 4-propoxyphenol; 4-n-butoxycyclohexanol can be obtained from 4-n-butoxyphenol; and 4-benzyloxycyclohexanol can be obtained from 4-benzyloxyphenyl. These 4-alkoxyphenols (ethers of hydroquinone) can be prepared by the method described by Klarmann, Gatyas and Shternov in J. Am. Chem. Soc., 54, 298 (1932).

PREPARATION 2.—4-METHOXYCYCLOHEXANONE AND OTHER 4-ALKOXYCYCLOHEXANONES

The oxidation of 4-methoxycyclohexanol (Preparation 1) was carried out according to the procedure of Helfer [Helv. Chim. Acta, 7, 953 (1924)]. To a solution of 90 grams of potassium dichromate in 120 grams of sulfuric acid and 400 milliliters of water cooled in an ice-bath was added with vigorous stirring 58.5 grams of 4-methoxycyclohexanol (Preparation 1). The temperature of the reaction mixture rose rapidly to 70 degrees centigrade, and the color became brown. Stirring was continued until the temperature decreased, after which the product was extracted with ether, isolated by removal of the ether and purified by distillation; it boiled at 72 degrees centigrade at a pressure of 9 millimeters of mercury.

In a like manner, 4-ethoxycyclohexanone can be obtained by the oxidation of 4-ethoxycyclohexanol; 4-propoxycyclohexanone can be obtained from 4-propoxycyclohexanol; 4-n-butoxycyclohexanone can be obtained from 4-n-butoxycyclohexanol; and 4-benzyloxycyclohexanone can be obtained from 4-benzyloxycyclohexanol.

PREPARATION 3.—2-CARBETHOXY-4-METHOXYCYCLOHEXANONE AND OTHER 2-CARBETHOXY-4-ALKOXYCYCLOHEXANONES

The preparation of this compound was carried out by the method heretofore described for the preparation of 2-carbethoxycyclohexanone (Snyder, Brooks and Shapiro, Org. Syntheses, Coll. vol. II, John Wiley and Sons, New York, 1943, p. 531; cf. Cook and Laurence, J. Chem. Soc., 1938, 58. To a solution of 46 grams (2 moles) of sodium in 600 milliliters of absolute ethanol in an ice-salt bath was added at 10 degrees centigrade with vigorous stirring a cold solution of 256 grams (2 moles) of 4-methoxycyclohexanone (Preparation 2) in 292 grams (2 moles) of ethyl oxalate during a period of 15 to 20 minutes. The mixture was stirred at ice-bath temperature for about 1 hour and at room temperature for about 6 hours, acidified with ice-cold sulfuric acid, and extracted with benzene. After removal of the benzene on a steam-bath, about 25 grams of powdered soft glass was added to the residual 2-ethoxalyl-4-methoxycyclohexanone and the mixture was heated to 150 degrees centigrade with stirring, at a subatmospheric pressure of approximately 50 millimeters of mercury, until the evolution of carbon monoxide had ceased. Distillation of the residue gave 132.4 grams (33 percent) of 2-carbethoxy-4-methoxycyclohexanone as heavy yellow oil which boiled at 100–105 degrees centigrade at a pressure of 1.2 millimeters of mercury.

In a like manner, 2-carbethoxy-4-ethoxycyclohexanone can be obtained by the ethoxalylation of 4-ethoxycyclohexanone followed by decarbonylation of the 2-ethoxyalyl-4-ethoxycyclohexanone; 2-carbethoxy-4-propoxycyclohexanone can be obtained from 4-propoxycyclohexanone; 2-carbethoxy-4-n-butoxycyclohexanone can be obtained from 4-n-butoxycyclohexanone; and 2-carbethoxy-4-benzyloxycyclohexanone can be obtained from 4-benzyloxycyclohexanone.

PREPARATION 4.—2-CARBETHOXY-2-(β-DIETHYLAMINOETHYL)-4-METHOXYCYCLOHEXANONE AND OTHER 2-CARBETHOXY-2-(β-DIETHYLAMINOETHYL)-4-ALKOXYCYCLOHEXANONES

To a suspension of 2.3 grams (0.1 mole) of sodium sand in 200 milliliters of anhydrous toluene was added dropwise with stirring a solution of 20.0 grams (0.1 mole) of 2-carbethoxy-4-methoxycyclohexanone (Preparation 3) in 25 milliliters of anhydrous toluene. After the addition, the mixture was heated under reflux with stirring for 3½ hours, and then stirred overnight at room temperature. The suspension of the sodio derivative was again heated to boiling and to it was added dropwise, with stirring during 3 hours, a solution of 13.6 grams (0.1 mole) of β-diethylaminoethyl chloride in 25 milliliters of anhydrous toluene. After heating under reflux for an additional 7 hours, the mixture was cooled and extracted with dilute hydrochloric acid. The acid extract was neutralized with sodium hydroxide solution, saturated with solid potassium carbonate and extracted with ether. The ether extracts were washed with water and dried, and the ether was evaporated. Distillation of the residue gave a 67 percent yield of 2-carbethoxy-2-(β-diethylaminoethyl)-4-methoxycyclohexanone as a nearly colorless liquid which boiled at 132–135 degrees centigrade at a pressure of 0.15 millimeter of mercury;

$n_D^{20} = 1.4715$

In a like manner, 2-carbethoxy-2-(β-di-n-butylaminoethyl)-4-benzyloxycyclohexanone can be obtained by the alkylation of 2-carbethoxy-4-benzyloxycyclohexanone with di-n-butylaminoethyl chloride, which can be prepared according to the procedures of Barnett et al. [J. Am. Chem. Soc., 59, 2248 (1937)] and Blicke and Maxwell [ibid., 64, 428 (1942)]; and 2-carbethoxy-2-(β-dibenzylaminoethyl)-4 - n-butoxycyclohexanone can be obtained by the alkylation of 2-carbethoxy-4-n-butoxycyclohexanone with dibenzylaminoethyl chloride, which can be prepared according to the procedure of Dupre et al. (J. Chem. Soc., 1949, 500).

PREPARATION 5.—2-(β-DIETHYLAMINOETHYL)-4-METHOXYCYCLOHEXANONE AND OTHER 2-(β-DIALKYLAMINOETHYL)-4-ALKOXYCYCLOHEXANONES

A solution of 17.0 grams (0.05 mole) of 2-carbethoxy-2-(β-diethylaminoethyl) - 4 - methoxycyclohexanone (Preparation 4) in 250 milliliters of 20 percent sulfuric acid was heated under reflux for 18 hours. After cooling, the solution was neutralized with sodium hydroxide, saturated with solid potassium carbonate and extracted with ether. The ether extracts were washed with water and dried, and the ether was evaporated. Distillation of the residue gave a 76 percent yield of 2-(β-diethylaminoethyl)-4-methoxycyclohexanone as a colorless oil which boiled at 112–114 degrees centigrade at a pressure of 0.3 millimeter of mercury; $n_D^{20} = 1.4680$. The product formed a crystalline salt with oxalic acid which melted at 111–112 degrees centigrade.

Analysis (oxalate):

Calculated for $C_{15}H_{27}O_6N$: C, 56.76; H, 8.58; N, 4.41
Found: C, 56.89; H, 8.58; N, 4.36

In a like manner, 2-(β-di-n-butylaminoethyl)-4-benzyloxycyclohexanone can be obtained from 2 - carbethoxy - 2 - (β-di-n-butylaminoethyl)-4-benzyloxycyclohexanone, and 2-(β-dibenzylaminoethyl)-4-n-butoxycyclohexanone can be obtained from 2-carbethoxy-2-(β-dibenzylaminoethyl)-4-n-butoxycyclohexanone.

PREPARATION 6.—1 - METHYL - 2 - (β - DIETHYLAMINOETHYL)-4-METHOXYCYCLOHEXANOL-1 AND OTHER 1-METHYL-2(β-DIALKYLAMINOETHYL) - 4 - ALKOXYCYCLOHEXANOLS

A solution of methyl lithium in 100 milliliters of anhydrous ether was prepared from 1.1 grams (0.16 mole) of lithium and 9.9 grams (0.07 mole) of methyl iodide. Excess lithium was removed by filtration under a nitrogen atmosphere. To the solution of methyl lithium, under a nitrogen atmosphere, was added dropwise with stirring a solution of 7.0 grams (0.034 mole) of 2-(β-diethylaminoethyl) - 4 - methoxycyclohexanone (Preparation 5) in 25 milliliters of anhydrous ether. When the addition was completed, the mixture was heated under reflux for 2 hours, cooled and poured onto ice. The ether layer was separated, and the aqueous layer, after saturation with solid potassium carbonate, was extracted with ether. The combined ether fractions were washed with water and dried, and the ether was evaporated. Distillation of the residue gave an 87 percent yield of 1-methyl-2-(β-diethylaminoethyl)-4-methoxycyclohexanol-1 as a colorless oil which boiled at 90–92 degrees centigrade at a pressure of 0.03 millimeter of mercury; $n_D^{20} = 1.4750$.

Analysis:

Calculated for $C_{14}H_{29}O_2N$: C, 69.09; H, 12.01; N, 5.76
Found: C, 68.97; H, 12.48; N, 5.77

In a like manner, 1-methyl-2-(β-di-n-butylaminoethyl)-4-benzyloxycyclohexanol-1 can be obtained from 2-(β-di-n-butylaminoethyl)-4-benzyloxycyclohexanone; and 1-methyl-2-(β-dibenzylaminoethyl) - 4 - n-butoxycyclohexanol-1 can be obtained from 2-(β-dibenzylaminoethyl)-4-n-butoxycyclohexanone.

PREPARATION 7.—1 - METHYL - 2 - (β - DIETHYLAMINOETHYL)-4-METHOXYCYCLOHEXENE-1 AND OTHER 1-METHYL-(2 - β - DIALKYLAMINOETHYL)-4-ALKOXYCYCLOHEXENES

To a solution of 12.1 grams (0.05 mole) of 1 - methyl - 2 - (β-diethylaminoethyl)-4-methoxycyclohexanol-1 (Preparation 6) in 20 milliliters of anhydrous pyridine and 40 milliliters of anhydrous benzene maintained in an ice-bath was added dropwise with stirring a solution of 8.0 grams of phosphorus tribromide in 20 milliliters of anhydrous benzene. When the addition was complete, the orange mixture was stirred overnight at room temperature. It was poured into water, stirred until solid material had dissolved, saturated with solid potassium carbonate, and extracted with ether. Removal of the solvents by distillation and distillation of the residue gave an 80 percent yield of 1-methyl-2-(β-diethylaminoethyl)-4-methoxycyclohexene-1 as a colorless oil which boiled at 85–87 degrees centigrade at a pressure of 0.12 millimeter of mercury; $n_D^{20} = 1.4730$. The product formed a crystalline salt with oxalic acid which melted at 111–112 degrees centigrade and a crystalline salt with methyl iodide which melted at 130–132 degrees centigrade.

Analysis (oxalate):

Calculated for $C_{16}H_{29}O_5N$: C, 60.93; H, 9.27; N, 4.44
Found: C, 60.83; H, 9.38; N, 4.70

Analysis (methiodide):

Calculated for $C_{15}H_{30}ONI$: C, 49.04; H, 8.23
Found: C, 49.07; H, 8.03

In a like manner, 1-methyl-2-(β-di-n-butylaminoethyl)-4-benzyloxycyclohexene-1 can be obtained from 1-methyl-2-(β-di-n-butylaminoethyl)-4-benzyloxycyclohexanol-1 (Preparation 6); and 1-methyl-2-(β-dibenzylaminoethyl)-4-n-butoxycyclohexene-1 can be obtained from 1-methyl-2-(β-dibenzylaminoethyl)-4-n-butoxycyclohexanol-1 (Preparation 6).

*Example 1.—1 - methyl - 2 - (β-bromoethyl) - 4-methoxycyclohexene-1 and other 1-methyl-2-(β-bromoethyl)-4-alkoxycyclohexenes*

To a solution of 56.4 grams (0.25 mole) of 1 - methyl - 2 - (β-diethylaminoethyl) - 4 - methoxycyclohexene-1 (Preparation 7) in 50 milliliters of anhydrous benzene was added dropwise during 2 hours with constant stirring a solution of 27.6 grams (0.26 mole) of cyanogen bromide in 150 milliliters of anhydrous benzene. During the addition the temperature of the reaction mixture rose to about 40 to 50 degrees centigrade. The bright red reaction mixture was heated gently under reflux for four hours, cooled, washed successively with dilute hydrochloric acid and water, and dried over anhydrous magnesium sulfate. Evaporation of the solvent under reduced pressure and fractionation of the residual red oil gave, in the second fraction, 4.7 grams (8 percent) of 1-methyl-2-(β-bromoethyl)-4-methoxycyclohexene-1 as a slightly yellowish oil boiling at 100–106 degrees centigrade at a pressure of 1.7 millimeters of mercury. Redistillation of the product gave 3.1 grams as a colorless oil which boiled at 61–62 degrees centigrade at a pressure of 0.10 millimeter of mercury; $n_D^{20}=1.5078$.

Analysis:
Calculated for $C_{10}H_{17}OBr$: C, 51.51; H, 7.35; Br, 34.28
Found: C, 52.42; H, 6.93; Br, 33.36
52.70; H, 7.25; Br, 33.56

In a like manner, 1-methyl-2-(β-bromoethyl)-4-benzyloxycyclohexene-1 can be obtained from 1-methyl-2-(β-di-n-butylaminoethyl)-4-benzyloxycyclohexene-1 (Preparation 7); and 1-methyl-2-(β-bromoethyl)-4-n-butoxycyclohexene-1 can be obtained from 1-methyl-2-(β-dibenzylaminoethyl)-4-n-butoxycyclohexene-1 (Preparation 7).

*Example 2.—1 - methyl - 2 - (β-chloroethyl)-4-methoxycyclohexene-1*

To a solution of 56.4 grams (0.25 mole) of 1-methyl-2-(β-diethylaminoethyl) - 4 - methoxycyclohexene-1 (Preparation 7) in 50 milliliters of anhydrous benzene was added dropwise during 2 hours with cooling and constant stirring a solution of 16.0 grams (0.26 mole) of cyanogen chloride in 150 milliliters of anhydrous benzene. After standing at room temperature for about an hour, the reaction mixture was heated gently under reflux for 4 hours, cooled, washed successively with dilute hydrochloric acid and water and dried over anhydrous magnesium sulfate. Evaporation of the solvent under reduced pressure and fractionation of the residual oil gives 1 - methyl - 2 - (β-chloroethyl)-4-methoxycyclohexene-1.

*Other examples*

In a manner similar to that described in the two foregoing examples, 1-methyl-2-(β-chloroethyl)-4-benzyloxycyclohexene-1 can be obtained from 1 - methyl-2-(β-di-n-butylaminoethyl) - 4-benzyloxycyclohexene-1 (Preparation 7); and 1-methyl - 2 - (β - chloroethyl)-4-n-butoxycyclohexene-1 can be obtained from 1-methyl-2-(β-dibenzylaminoethyl) - 4 - n - butoxycyclohexene-1 (Preparation 7).

I claim:

1. A 1-methyl-2-(β-haloethyl)-4-hydrocarbonoxycyclohexene having the formula:

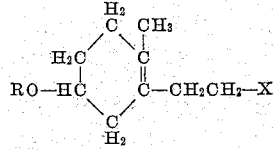

wherein R is a hydrocarbon radical containing from one to seven carbon atoms, inclusive, and X is a halogen atom.

2. A 1-methyl-2-(β-haloethyl)-4-alkoxycyclohexene.

3. A 1-methyl-2-(β-haloethyl) - 4 - methoxycyclohexene.

4. A 1-methyl-2-(β-bromoethyl)-4-alkoxycyclohexene.

5. 1-methyl-2-(β-bromoethyl) - 4 - methoxycyclohexene-1.

6. 1 - methyl-2-(β-chloroethyl) - 4 - methoxycyclohexene-1.

7. A process for the preparation of a 1-methyl-2-(β-haloethyl)-4-hydrocarbonoxycyclohexene-1 having the formula:

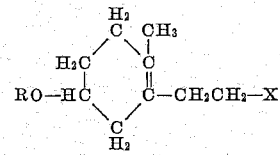

wherein R is a hydrocarbon radical containing from one to seven carbon atoms, inclusive, and X is a halogen atom, comprising the steps of reacting a compound having the formula:

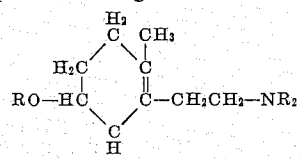

wherein each R is a hydrocarbon radical containing from one to seven carbon atoms, inclusive, with a cyanogen halide, decomposing the resulting addition product, and recovering the 1-methyl-2-(β-haloethyl) - 4 - hydrocarbonoxycyclohexene-1.

8. A process for the preparation of 1-methyl-2-(β-bromoethyl)-4-methoxycyclohexene-1 having the formula:

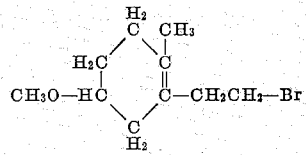

comprising the steps of reacting a compound having the formula:

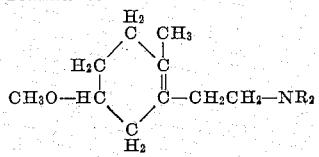

wherein R is a hydrocarbon radical containing from one to seven carbon atoms, inclusive, with cyanogen bromide, decomposing the resulting addition product, and recovering the 1-methyl-2-(β-bromoethyl)-4-methoxycyclohexene-1.

9. A process for the preparation of 1-methyl-2-(β-chloroethyl)-4-methoxycyclohexene-1 having the formula:

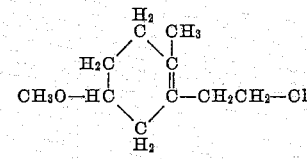

comprising the steps of reacting a compound having the formula:

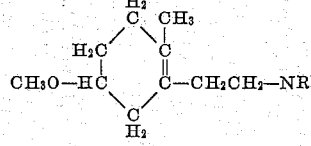

wherein R is a hydrocarbon radical containing from one to seven carbon atoms, inclusive, with cyanogen chloride, decomposing the resulting addition product, and recovering the 1-methyl-2-(β-chloroethyl)-4-methoxycyclohexene-1.

JOHN A. HOGG.

References Cited in the file of this patent
Braun et al., Annalen der Chemie (German), vol. 507, pp. 1–13 (1933).